June 24, 1924.

C. M. PINCKNEY

RESILIENT TIRE

Filed Sept. 18, 1923

1,498,931

Inventor
C. M. Pinckney

By D. Swift
Attorney

Patented June 24, 1924.

1,498,931

UNITED STATES PATENT OFFICE.

CHAUNCEY M. PINCKNEY, OF DENVER, COLORADO.

RESILIENT TIRE.

Application filed September 18, 1923. Serial No. 663,402.

*To all whom it may concern:*

Be it known that I, CHAUNCEY M. PINCKNEY, a citizen of the United States, residing at Denver, in the county of Denver, State of Colorado, have invented a new and useful Resilient Tire; and I do hereby declare the following to be a full, clear, and exact description of the invention, such as will enable others skilled in the art to which it appertains to make and use the same.

The invention relates to resilient tires for use on automobile wheels, and has for its object to provide a device of this character which will be resilient, and which will obviate the necessity of inflating the tire, thereby obviating puncture or deflation of the tire.

A further object is to provide an automobile tire comprising a circumferentially coiled spring adapted to be received on the rim of an automobile wheel, a flexible metallic band extending around the spring circumferentially and a tire casing in which the band and spring are disposed and held by means of the wheel flanges. The band forms means for crowding the tire casing flanges into engagement with the wheel flanges thereby insuring positive holding of the tire casing. The tire casing takes up the initial shock and the other shock portion is taken up in the coiled spring and band, therefore the entire shock is taken up in the tire as a whole before it reaches the vehicle.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1:
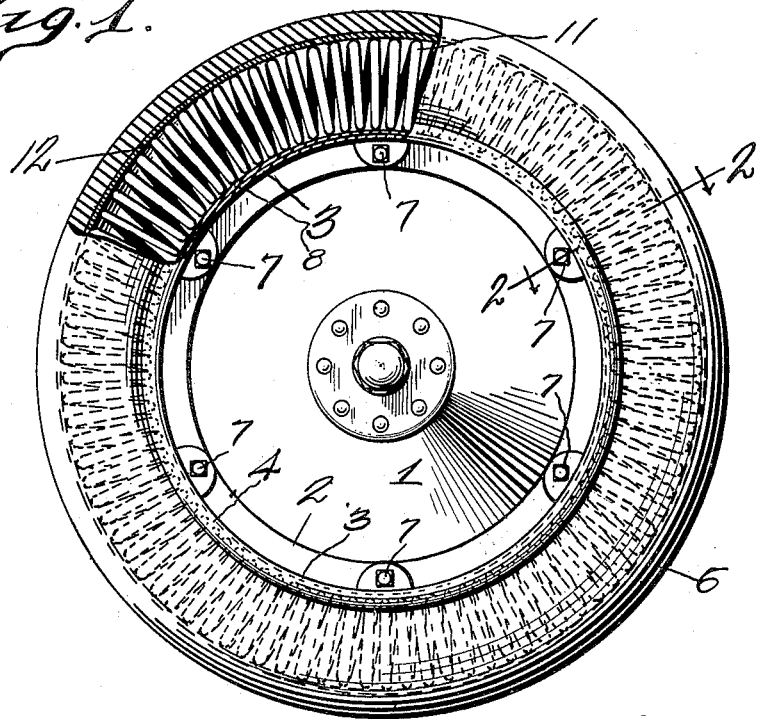
Figure 1 is a side elevation of the tire, showing the same on a wheel and partially broken away to better show the structure.
Figure 2:
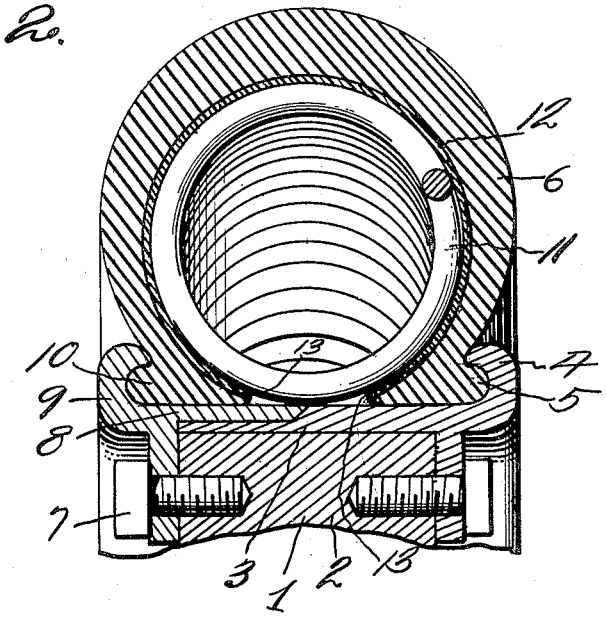
Figure 2 is a transverse sectional view through the tire and a portion of the wheel taken on line 2—2 of Figure 1.

Referring to the drawing, the numeral 1 designates a conventional form of automobile wheel and 2 the felly thereof. Disposed on the periphery of the felly 2 is a rim 3, which rim has one of its sides provided with a flange 4 for receiving and holding the bead 5 of the tire casing 6. Secured detachably by means of bolts 7 to the opposite side of the felly 2 is a removable rim section 8, which is provided with a clincher flange 9 adapted to engage the tire bead 10 and which in combination with the flange 4 securely holds the tire 6 on the rim 3 in the usual manner.

Surrounding the rim 3 and in engagement with the periphery thereof is an endless coiled spring 11, the convolutions of which are substantially radially disposed, and are flexed inwardly as the automobile goes over the ground for partially taking up the shock. Surrounding the coiled spring is a metallic casing 12, preferably formed from spring material, with which metallic casing the inner wall of the tire casing 6 engages. The tire casing 6 is formed of rubber and partially takes up the shock as the wheel goes over rough ground, however the shock which is not taken up by the rubber tire casing 6 is taken up by the metallic casing 12 and the coiled spring 11. As the tire is compressed, the metallic casing 12 is transversely spread and its sides 13 are forced outwardly, thereby crowding the beads 5 and 10 into close engagement with the clincher flanges 4 and 9, thereby insuring a positive holding of the tire casing 6 at all times.

From the above it will be seen that a resilient tire is provided for automobile wheels, wherein explosions of the tire incident to puncture is obviated, and one wherein inflating the tire is eliminated and the tire constructed in a manner whereby upon puncture of the same the resiliency of the tire will not be affected. It will also be seen that a coiled spring and a metallic casing is used for partially taking up the shock, and that by eliminating the inflation feature, the tire casing 6 may be used until the tread portion thereof is worn through if so desired, thereby reducing the cost of upkeep of automobiles, as far as tires are concerned, to a minimum.

The invention having been set forth what is claimed as new and useful is:—

The combination with an automobile wheel, a rim surrounding said wheel, a detachable ring, clincher flanges carried by the detachable ring and the rim, of a tire disposed on said rim, said tire comprising a tire casing, clincher beads carried by said tire casing and with which the clincher flanges engage, an endless coiled spring surrounding the rim and in engagement therewith and having its convolutions substantially radially disposed, a yieldable metallic casing extending around the coiled spring, the adjacent sides of said yieldable metallic casing being disposed adjacent the clincher beads and periphery of the detachable ring and forming means whereby upon a compression of the tire the clincher beads will be forced outwardly into engagement with the clincher flanges.

In testimony whereof I have signed my name to this specification in the presence of two subscribing witnesses.

CHAUNCEY M. PINCKNEY.

Witnesses:
   JOHN H. MOONEY,
   H. N. SALES.